March 21, 1961    F. P. FORD ET AL    2,975,816
LAMINATED STRUCTURES
Filed Feb. 27, 1957
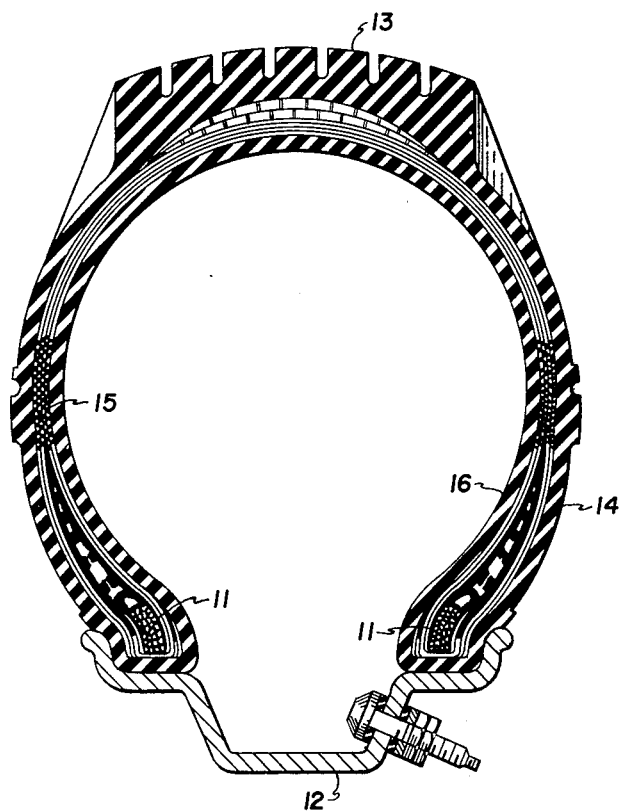
Francis P. Ford
Samuel B. Robison    Inventors
By W. N. Smyers    Attorney

United States Patent Office 2,975,816
Patented Mar. 21, 1961

2,975,816
LAMINATED STRUCTURES

Francis P. Ford, Watchung, and Samuel B. Robison, Roselle, N.J., assignors to Esso Research and Engineering Company, a corporation of Delaware
Filed Feb. 27, 1957, Ser. No. 642,700
8 Claims. (Cl. 152—330)

This invention relates to laminated structures and particularly to those used in pneumatic tire constructions. The present invention also relates to high unsaturation rubbers and/or blends of high unsaturation rubbers, particularly natural rubber and/or diene synthetic rubbers and chlorinated butyl rubber which have been modified with certain N-halogeno compounds. The instant invention further relates to the production of high quality laminated structures such as conveyor or power transmission belting, steam hose, wire insulation, or especially tubeless tires containing at least three layers; namely, an inner lining of chlorinated butyl rubber and a high unsaturation rubber modified with certain N-bromo compounds, a carcass layer containing one or more highly unsaturated rubbers modified with an N-bromo compound, and an outer rubber layer containing at least one rubbery polymer.

The invention will be best understood from the following description when read in conjunction with the accompanying drawing in which the single figure is a vertical section of a pneumatic tubeless tire produced in accordance with the present invention.

It is known that butyl-type rubbery copolymers are ideally suited for use in inner tubes of tires because of their low air permeability. However, with respect to inner linings of tubeless tires, butyl rubber, although of low gas-permeability, does not adhere satisfactorily to the interior of conventional high unsaturation carcass layers in such tires. This deficiency may only be partially overcome by the use of halogenated butyl rubbers such as brominated butyl rubber or especially chlorinated butyl rubber. Recent tests have shown that of all known modified or halogenated butyl rubbers, chlorinated butyl rubber, because of exceptionally good air impermeability, flex properties and especially heat resistance and aging properties, is the ideal rubber for use as an inner liner of tubeless tires. 100 parts by weight of the chlorinated butyl rubber may be vulcanized alone or co-vulcanized with about 0.1 to 35 parts by weight of high unsaturation rubbery polymers or copolymers without materially changing the foregoing desirable physical properties of inner liners.

Many attempts have recently been made to adhere chlorinated butyl rubber inner liners to carcasses containing highly unsaturated rubbery polymers and copolymers. For instance, the use of layers containing blends of 15 to 85 weight percent of high unsaturation rubbers and 15 to 85 weight percent of chlorinated butyl rubber, interposed between the inner liner and carcass, have been tried without materially increasing the adhesion of the liner to the carcass. It has, however, surprisingly been found that when the inner liner contains a major proportion, preferably about 60 to 95 parts by weight of chlorinated butyl rubber and a minor proportion, preferably about 5 to 40 parts by weight of a high unsaturation rubber, excellent adhesion to the carcass is obtained if either the rubber of the inner liner or carcass or both are reacted with minor proportions of N-bromo compounds.

In accordance with the present invention, an inner lining of a tubeless tire containing about 60 to 95, preferably about 70 to 85 parts by weight of chlorinated butyl rubber and about 5 to 40, preferably about 15 to 30 parts by weight of a high unsaturation rubber, preferably having an iodine number of about 200 to 450, is adhered to a carcass containing one or more highly unsaturated rubbers by reacting either the rubber of the inner liner or of the carcass or both with about 0.1 to 5.0 weight percent, preferably about 0.5 to 3.0 weight percent based on total weight of rubbery materials of an N-bromo cyclic imide at a temperature level of between about 50° and 200° C. (i.e. about 120° to 400° F.) and preferably between about 90° and 150° C. (i.e. about 200° to 300° F.) for a time of between about 0.5 and 60 minutes, preferably between about 1 and 20 minutes.

The N-bromo compounds useful for the purposes of the present invention include, among others such N-bromo cyclic imides as N,N'-dibromo-5,5-dimethylhydantoin, N-bromo succinimide, N-bromo phthalimide, etc.

The foregoing N-bromo cyclic imides may be generalized by the formulae:

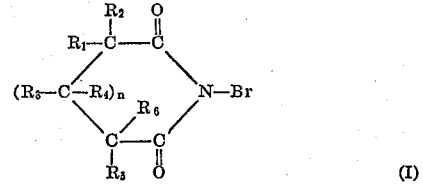

(I)

and

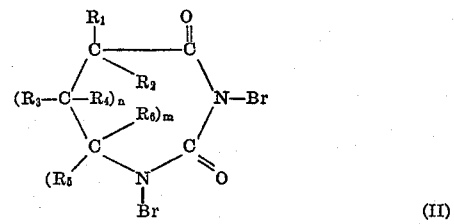

(II)

wherein $n$ and $m$ are 0 to 20, $R_1$ to $R_6$ being selected from the group consisting of hydrogen, and $C_1$ to $C_{18}$ alkyl, aryl, aralkyl and alkaryl groups.

Butyl rubber, as known in the art and as referred to in this specification and in the appended claims, is a vulcanizable rubbery hydrocarbon copolymer containing about 85 to 99.5%, preferably 95 to 99.5% of a $C_4$ to $C_8$ isoolefin such as 2-methyl-1-butene, 3-methyl-1-butene, or especially isobutylene, the remainder being a $C_4$ to $C_{14}$ multiolefin, preferably a $C_4$ to $C_6$ conjugated diolefin such as butadiene, dimethyl butadiene, piperylene or especially isoprene. This copolymer generally has a viscosity average molecular weight of about 100,000 to about 3,000,000 and a mole percent unsaturation of about 0.2 to 15.0. The preparation of butyl-type rubbers is described in U.S. Patent 2,356,128 to Thomas et al. and also in other patents as well as in technical literature.

Chlorinated butyl rubber is produced by the mild chlorination of the unvulcanized hydrocarbon copolymer in a manner which does not degrade the molecular weight thereof, but sufficiently to produce a rubber which retains its tensile strength upon heat-aging. The chlorination is preferably carried out so as to make the resultant chlorinated butyl rubber contain about at least 0.5 weight percent (preferably at least about 1.0 weight percent) combined chlorine, but not more than about "X" weight percent combined chlorine wherein:

$$X = \frac{35.46\,L}{(100-L)M_1 + L(M_2 + 35.46)} \times 100$$

and $L$ = mole percent of the multiolefin in the polymer
$M_1$ = molecular weight of the isoolefin
$M_2$ = molecular weight of the multiolefin
35.46 = atomic weight of chlorine Restated, there should be at least about 0.5 weight percent of combined chlorine in the polymer but not more than about one atom of chlorine combined in the polymer per molecule of multiolefin present therein; i.e. not more than about one atom of combined chlorine per double bond in the polymer. The maximum mole percent of combined chlorine is generally about 0.25–0.80 times the mole percent unsaturation of the polymer. Normally the chlorine content of chlorinated copolymers containing up to about 15% combined multiolefin should be within about 0.1 to 10.0% chlorine preferably about 0.5 to 3.0% chlorine based on the total weight of rubbery copolymer.

Suitable chlorinating agents which may be employed are chlorine, alkali metal hypochlorites, oxygenated sulfur chlorides, pyridinium chloride perchloride, alpha-chloroacetoacetanilide, beta-chloro-methyl phthalimide, iodine chloride, and other common chlorinating agents. The preferred chlorinating agents are molecular chlorine, N-chlorosuccinimide, chloro-hydantoins, iodine chloride, and sulfuryl chloride. The chlorination is conducted at temperatures of above 0° up to about 100° C. and preferably at about 20° to 60° C. for about one minute to several hours. However, the temperatures and times are regulated to chlorinate the rubbery copolymer to the extent above-mentioned.

The chlorination is accomplished by preparing a solution of about 1 to 80% by weight, preferably about 5 to 60% by weight of the above rubbery copolymer in an inert liquid solvent such as an inert hydrocarbon or advantageously halogenated derivatives of saturated hydrocarbons, examples of which are hexane, naphtha, mineral spirits, benzene, chloroform, carbon tetrachloride, etc., and adding thereto chlorine or other chlorinating agent, optionally in solution, such as dissolved in an alkyl chloride, carbon tetrachloride, etc. The use of elevated or depressed pressures is optional since atmospheric pressure is satisfactory although the pressure may vary, depending upon the foregoing temperatures and times from about 1 to 400 p.s.i.a.

When chlorinating butyl rubber with gaseous chlorine, the chlorine gas may also be diluted with up to about 80 times its volume, preferably about 0.1 to 25.0 times its volume of an inert gas such as nitrogen, methane, ethane, carbon dioxide, etc. In chlorinating the butyl rubber with gaseous chlorine in batch procedure, the chlorine is preferably added relatively slowly to a preformed solution of the butyl rubber with agitation. The chlorine is advantageously added over a period of about 1 to 20 minutes depending upon the degree of agitation. The amount of gaseous chlorine added to a butyl rubber copolymer dissolved in a completely inert hydrocarbon is approximately twice that which is desired to be combined with the butyl polymer, since for one mole of chlorine, one chlorine atom combines with the polymer essentially by replacing a hydrogen atom from said polymer and the other atom is evolved as hydrogen chloride.

The chlorinated copolymer formed advantageously has a viscosity average molecular weight between about 100,000 and 3,000,000 and a mole percent unsaturation between about 0.2 to 15.0, advantageously about 0.4 to 10.0 and preferably about 0.6 to 3.0. This copolymer, when cured, has good to excellent tensile strength, extension modulus, abrasion resistance, elongation and flexure resistance and outstanding gas impermeability and heat aging properties.

Referring now to the drawing, the single figure depicts a pneumatic tubeless tire which comprises a hollow toroidal type member which is substantially U shaped in cross-section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute bead portions 11—11 of the tire inside of which are a plurality of bead wires, adhesively imbedded and molded in a rubber. The outer surfaces of the bead portions and/or rim 12 are advantageously formed into an air-sealing means, such as a plurality of ribs to aid in adhesion of the bead portions to the rim when the tire is inflated. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to the conventional fabrication, but in general, the tire is a multi-layered type of structure with an outer layer as hereinbefore mentioned. The layer next adjacent the outer layer comprises a carcass 15 which includes a high unsaturation rubber or rubbers which have been reacted with N-bromo compounds in accordance with the present invention. Carcass 15 has incorporated therein, a fabric composed of a plurality of cotton, rayon, nylon, and/or steel cords. The tire also includes an inner lining 16 made from chlorinated butyl rubber and a high unsaturation rubber which have been reacted with an N-bromo compound in accordance with the present invention. The inner lining thus produced, when vulcanized, is substantially impermeable to air. The above multi-layers, at least three in number, are conventionally bonded or otherwise adhered together, for example, by vulcanizing for about 1 to 500 minutes at a temperature level of about 90° to 230° C. (i.e., 200° to 450° F.) to form a tire of a unitary structure.

In order to more fully illustrate the present invention, the following experimental data are given.

Example I

Blends of chlorinated butyl rubber (hereinafter referred to as chlorinated butyl rubber #1) with natural rubber were tested for adhesion to natural rubber, the natural rubber being first masticated at room temperature for 5 minutes on a rubber mill. The chlorinated butyl rubber employed had an 8 minute Mooney viscosity at 212° F. of 71.0, a mole percent unsaturation of 1.47, a viscosity average molecular weight of 420,000 and contained 1.39 weight percent of chlorine. All rubber stocks were compounded on a cold mill as indicated hereinafter, formed in test sandwiches backed with cotton duck and were 1 inch wide, 0.25 inch thick, and 6 inches long and vulcanized at 307° F. for 45 minutes. The sandwiches were then heated to 212° F. and pulled immediately on removal from the oven by a Scott tensile tester operating at a jaw separation rate of 2 inches per minute. The blend of chlorinated butyl rubber with natural rubber was reacted prior to compounding with an N-bromo cyclic imide (i.e. N,N'-dimethyl dibromohydantoin) for 10 minutes at 250° F. on a 12 inch mill before compounding. The compounding and sandwich adhesion data were as follows:

| | Parts by weight | | |
|---|---|---|---|
| Stock No. | A | B | C |
| Natural rubber (smoked sheets) | 100 | 20 | 20 |
| Chlorinated butyl rubber #1 | | 80 | 80 |
| N,N'-dimethyl dibromohydantoin | | | 1.0 |
| Carbon black (MPC) | 40 | | |
| Stearic acid | 1.0 | 0.5 | 0.5 |
| Calcined clay (Whitetex) | | 72 | 72 |
| Zinc oxide | 5.0 | 7.5 | 7.5 |
| Diorthotolyl guanidine | 1.0 | | |
| Mercaptobenzothiazole | | 0.7 | 0.7 |
| Tetramethyl thiuram disulfide | | 0.35 | 0.35 |
| Sulfur | 2.0 | 2.0 | 2.0 |
| Antioxidant-2,2'methylene bis(4-methyl-6-tertiary butyl-phenol) | | 0.5 | 0.5 |
| Plasticizer hydrocarbon oil [1] | | 3.0 | 3.0 |
| Adhesion to Stock A (lbs./inch) | | 11 | 35 |

[1] The plasticizer oil is a hydrocarbon oil derived from a naphthenic crude and having the following characteristics:

| Property | Employed | Typical Range |
|---|---|---|
| Specific gravity | 0.90 | 0.80–0.97 |
| Flash Point, °F. (open cup method) | 445 | 300–550 |
| Viscosity, S.S.U. at 100° F | 510 | 50–2,000 |
| Viscosity, S.S.U. at 210° F | 55 | 15–200 |
| Iodine No. (cg./g.) | 16 | 0–30 |

The above data show that a blend of chlorinated butyl rubber and natural rubber which has been thermally reacted with an N-bromo compound, in accordance with the present invention, adheres strongly to natural rubber.

*Example II*

The same general procedure as in Example I was repeated except that one part by weight of N,N'-dimethyl dibromohydantoin was reacted with the natural rubber sandwich component in addition to the rubber blend of chlorinated butyl rubber #1 and natural rubber. The result was as follows:

| Sandwich adhesion data | Adhesion in pounds per linear inch |
|---|---|
| Stock A to stock C (both reacted with N-bromo compound) | 40 |

The above data show that good adhesion between natural rubber and a blend of chlorinated butyl rubber and natural rubber is obtained by thermally reacting both with N-bromo compounds in accordance with the present invention.

*Example III*

The same general procedure as in Example I was again repeated except that N,N'-dimethyldibromo hydantoin was reacted prior to compounding with the natural rubber component of the test sandwich rather than the chlorinated butyl rubber-containing blend. The compounding data and adhesions were as follows:

| Stock No. | D | E | F | G | H |
|---|---|---|---|---|---|
| Natural rubber (smoked sheets) | 20 | 100 | 100 | 20 | 100 |
| N,N'-dimethyl dibromo hydantoin | | 1.0 | ¹1.0 | | |
| N-bromo succinimide | | | | | 1.0 |
| Chlorinated butyl rubber #1 | 80 | | | 80 | |
| Carbon black (MPC) | | 40 | 40 | | 40 |
| Carbon black (SRF) | | | | 50 | |
| Calcined clay (Whitetex) | 72 | | | | |
| 2,6-dimethylol-4-octyl phenol resin | | | | 5.0 | |
| Zinc oxide | 7.5 | 5.0 | 5.0 | 5.0 | 5.0 |
| Stearic acid | 0.5 | | | | |
| Sulfur | 2.0 | 2.0 | 2.0 | 2.0 | 2.0 |
| Diorthotolyl guanidine | | 1.0 | 1.0 | | 1.0 |
| Mercaptobenzothiazole | 0.70 | | | | |
| Tetramethyl thiuram disulfide | 0.35 | | | | |
| N-cyclohexyl-2-benzothiazole sulfenamide | | | | 0.70 | |
| Plasticizer hydrocarbon oil (see Example I) | 3.0 | | | | |
| Antioxidant-2,2'-methylene bis(4-methyl-6-tertiary butyl phenol) | 0.5 | | | | |

| Sandwich adhesion data | Adhesion in pounds per linear inch |
|---|---|
| Stock G to stock H | 33 |
| Stock D to stock E | 37 |
| Stock E to stock G | 34 |
| Stock D to stock F | 12 |

¹ Stock No. "F" was not hot milled with the N-bromo compound prior to compounding and curing.

Stock numbers E and G were separately tested for stress-strain properties after vulcanization for 45 minutes at 307° F. The resulting physical inspections were as follows:

| Property | Stock E | Stock G |
|---|---|---|
| Modulus at 300% elong. (p.s.i.) | 990 | 1,170 |
| Tensile strength (p.s.i.) | 1,640 | 2,000 |
| Elongation (percent) | 420 | 515 |

The above data show that natural rubber compositions which had been thermally reacted with N-bromo compounds adhere strongly to two separate chlorinated butyl rubber-natural rubber blends, each compounded differently. Also, failure to thermally react the N-bromo compound with the natural rubber prior to vulcanization results in a much lower adhesion value (stock D to stock F). When 1.0 part by weight of either N-chlorosuccinimide or N,N'-dimethyl dichloro hydantoin was substituted for the 1.0 part by weight of N,N'-dimethyl dibromo hydantoin in stock No. E, only 2 to 4 pounds adhesion to stocks D and G were obtained. Similarly when the above N-chloro compounds were added to stock F, only 5 pounds adhesion to stock D was obtained. This shows that N-chloro compounds may not be substituted for N-bromo compounds when practicing the present invention. The compounded stocks of the present invention were also noted to have good stress-strain properties.

*Example IV*

Various blends of chlorinated butyl rubber and natural rubber were tested for adhesion to a portion of stock No. E of Example III. 100 parts by weight of each rubbery blend were compounded with 50 parts by weight of SRF carbon black, 5.0 parts by weight of zinc oxide, 5.0 parts by weight of 2,6-dimethylol-4-octyl phenol resin, 0.7 part by weight of N-cyclohexyl-2-benzothiazole sulfenamide, and 2.0 parts by weight of sulfur. The compounded stocks (I to L) were milled at 200° F. for 5 minutes after the addition of the resin prior to forming into test sandwiches, cured at 307° F. for 40 minutes, and tested for adhesion in accordance with Example I. The additional compounding data and adhesion results were as follows:

| Stock No. | I | J | K | L |
|---|---|---|---|---|
| Chlorinated butyl rubber #1 | 95 | 90 | 85 | 70 |
| Natural rubber (smoked sheets) | 5 | 10 | 15 | 30 |
| Adhesion to stock E in pounds per inch at 212° F | 35 | 40 | 35 | 25 |

The above data show that the proportions of chlorinated butyl rubber and natural rubber in the rubber blend may be varied over a wide range and still obtain excellent adhesions in accordance with the present invention.

*Example V*

The same general procedure as in Example III was repeated adhering to stock No. G various stocks of natural rubber or GR-S rubber which had been thermally reacted with different amounts of N,N'-dimethyl dibromohydantoin as indicated hereinafter. Stock Nos. M, N, and P were heated for 10 minutes at 250° F. with the N-bromo compound prior to adding 40 parts by weight of MPC carbon black whereas stock No. O was heated in the presence of the carbon black. 100 parts by weight of each rubber were then compounded with 5.0 parts by weight of zinc oxide, 1 part by weight of stearic acid, 1.0 part by weight of diorthotolyl guanidine, and 2.0 parts by weight of sulfur, formed into test sandwiches, cured, and tested for adhesion in accordance with Example I. The additional compound data and adhesion results were as follows:

| Stock No. | Parts by weight | | | |
|---|---|---|---|---|
| | M | N | O | P |
| Natural rubber (smoked sheets) | 100 | 100 | 100 | |
| GR-S-1500 rubber | | | | 100 |
| N,N'-dimethyl dibromohydantoin | 1.0 | 2.0 | 1.0 | 1.0 |
| Adhesion to stock G in lbs./inch | 35 | 40 | 40 | 45 |

The above data show that N,N'-dimethyl dibromo hydantoin is effective in promoting adhesion when used at two different concentration levels and regardless of whether before or after adding carbon black. The data also show that GR-S rubber may be substituted for natural rubber in accordance with the present invention.

Resort may be had to various modifications and variations of the disclosed embodiments without departing from the spirit of the invention or the scope of the appended claims.

What is claimed is:

1. A process which comprises forming a first layer comprising a major proportion of a chlorinated butyl rubber copolymer of a $C_4$ to $C_8$ isoolefin with a $C_4$ to $C_{14}$ multiolefin containing therein at least about 0.5 weight percent combined chlorine but not more than about one combined atom of chlorine per double bond in the copolymer blended with a minor proportion of high unsaturation rubber; forming a second layer of a high unsaturation rubber; reacting at least one of said layers with about 0.1 to 5.0 weight percent of a N-bromo cyclic imide compound selected from the group consisting of the general formula

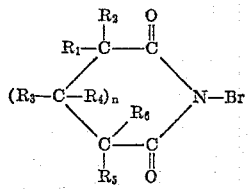

wherein $n$ is 0 to 20 and $R_1$ to $R_6$ are selected from the group consisting of hydrogen and $C_1$ to $C_{18}$ alkyl, aryl, aralkyl and alkaryl groups and the general formula

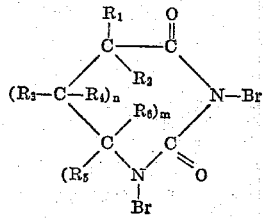

wherein $n$ and $m$ are 0 to 20 and $R_1$ to $R_6$ are selected from the group consisting of hydrogen and $C_1$ to $C_{18}$ alkyl, aryl, aralkyl and alkaryl groups at a temperature level of between about 50° and 200° C.; and subsequently vulcanizing said first layer in contact with said second layer at a temperature between 90° and 230° C. to provide a laminated structure therefrom having an adhesion between said layers of at least 20 pounds per inch at 212° F.

2. A laminated structure which comprises a first layer comprising a major proportion of a chlorinated butyl rubber copolymer of a $C_4$ to $C_8$ isoolefin with a $C_4$ to $C_{14}$ multiolefin, containing therein at least about 0.5 weight percent combined chlorine but not more than about one combined atom of chlorine per double bond in the copolymer, blended with a minor proportion of a high unsaturation rubber; and a second layer comprising at least one high unsaturation rubber; at least one of said layers having been reacted at a temperature between 200° and 300° F. for a time of between about 1 and 20 minutes with a N-bromo cyclic imide compound selected from the group consisting of the general formula

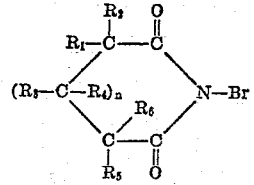

wherein $n$ is 0 to 20 and $R_1$ to $R_6$ are selected from the group consisting of hydrogen and $C_1$ to $C_{18}$ alkyl, aryl, aralkyl and alkaryl groups and the general formula

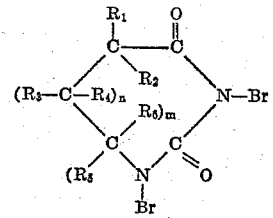

wherein $n$ and $m$ are 0 to 20 and $R_1$ to $R_6$ are selected from the group consisting of hydrogen and $C_1$ to $C_{18}$ alkyl, aryl, aralkyl and alkaryl groups; said layers having been subsequently vulcanized in contact with each other at a temperature between 90° and 230° C. for 1 to 500 minutes; said laminated structure having an adhesion between said layers of at least 20 pounds per inch at 212° F.

3. A method of producing a laminated pneumatic tubeless rubber tire which comprises forming an inner layer of said tire comprising a major proportion of a chlorinated butyl rubber copolymer of a $C_4$ to $C_8$ isoolefin with a $C_4$ to $C_{14}$ multiolefin containing therein at least about 0.5 weight percent combined chlorine but not more than about one combined atom of chlorine per double bond in the polymer blended with a minor proportion of a high unsaturation rubber; forming a carcass layer of a high unsaturation rubber; reacting at least one of said layers at a temperature between 50° and 200° C. for 1 to 20 minutes with about 0.1 to 5.0 weight percent of a N-bromo cyclic imide compound selected from the group consisting of the general formula

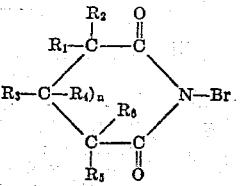

wherein $n$ is 0 to 20 and $R_1$ to $R_6$ are selected from the group consisting of hydrogen and $C_1$ to $C_{18}$ alkyl, aryl, aralkyl and alkaryl groups and the general formula

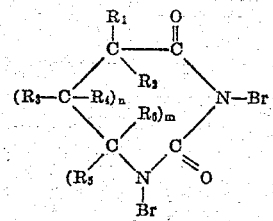

wherein $n$ and $m$ are 0 to 20 and $R_1$ to $R_6$ are selected from the group consisting of hydrogen and $C_1$ to $C_{18}$ alkyl, aryl, aralkyl and alkaryl groups; and subsequently vulcanizing said inner layer in contact with said carcass layer at a temperature between 90° and 230° C. for between about 1 and 500 minutes to provide adhesion between said layers of at least 20 pounds per inch at 212° F.

4. A tubeless rubber tire which comprises an inner layer comprising a major proportion of a chlorinated butyl rubber copolymer of a $C_4$ to $C_8$ isoolefin with a $C_4$ to $C_{14}$ multiolefin containing therein at least about 0.5 weight percent combined chlorine but not more than about one combined atom of chlorine per double bond in the copolymer blended with a minor proportion of a high unsaturation rubber; and a carcass layer comprising at least one high unsaturation rubber; at least one of said layers having been reacted at a temperature between 50° and 200° C. for 1 to 20 minutes with a N-bromo cyclic imide compound selected from the group consisting of the general formula

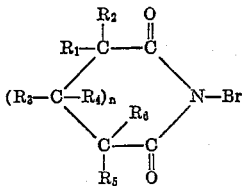

wherein $n$ is 0 to 20 and $R_1$ to $R_6$ are selected from the group consisting of hydrogen and $C_1$ to $C_{18}$ alkyl, aryl, aralkyl and alkaryl groups and the general formula

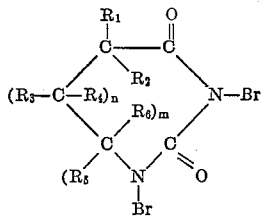

wherein $n$ and $m$ are 0 to 20 and $R_1$ to $R_6$ are selected from the group consisting of hydrogen and $C_1$ to $C_{18}$ alkyl, aryl, aralkyl and alkaryl groups; said layers having been subsequently vulcanized in contact with each other at a temperature between 90° and 230° C. for 1 to 500 minutes; said tire having an adhesion between said layers of at least 20 pounds per inch at 212° F.

5. The process according to claim 2 in which the N-bromo cyclic imide compound is N,N'-dibromo-5,5-dimethylhydantoin.

6. The process according to claim 2 in which the N-bromo cyclic imide compound is N-bromo succinimide.

7. The process according to claim 2 in which the N-bromo cyclic imide compound is N-bromo phthalimide.

8. A laminated structure which comprises a first layer comprising a major proportion of a chlorinated butyl rubber copolymer of a $C_4$ to $C_8$ isoolefin with a $C_4$ to $C_{14}$ multiolefin, containing therein at least about 0.5 weight percent combined chlorine but not more than about one combined atom of chlorine per double bond in the copolymer, blended with a minor proportion of a high unsaturation rubber; and a second layer comprising at least one high unsaturation rubber; said first layer having been reacted at a temperature between 200° and 300° F. for a time of between about 1 and 20 minutes with a N-bromo cyclic imide compound selected from the group consisting of the general formula

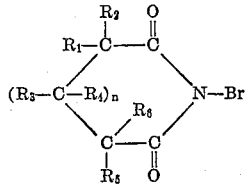

wherein $n$ is 0 to 20 and $R_1$ to $R_6$ are selected from the group consisting of hydrogen and $C_1$ to $C_{18}$ alkyl, aryl, aralkyl and alkaryl groups and the general formula

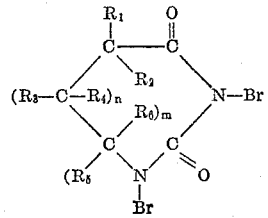

wherein $n$ and $m$ are 0 to 20 and $R_1$ to $R_6$ are selected from the group consisting of hydrogen and $C_1$ to $C_{18}$ alkyl, aryl, aralkyl and alkaryl groups; said layers having been subsequently vulcanized in contact with each other at a temperature between 90° and 230° C. for 1 to 500 minutes; said laminated structure having an adhesion between said layers of at least 20 pounds per inch at 212° F.

References Cited in the file of this patent
UNITED STATES PATENTS

| | | |
|---|---|---|
| 2,416,668 | Schroeder | Mar. 4, 1947 |
| 2,442,083 | Hall et al. | May 25, 1948 |
| 2,631,984 | Crawford et al. | Mar. 17, 1953 |
| 2,698,042 | Perkins | Dec. 28, 1954 |
| 2,720,479 | Crawford et al. | Oct. 11, 1955 |
| 2,732,354 | Morrissey et al. | Jan. 24, 1956 |
| 2,741,295 | Kindle et al. | Apr. 10, 1956 |
| 2,752,978 | Kindle et al. | July 3, 1956 |
| 2,752,980 | Riggs | July 3, 1956 |
| 2,776,699 | Kindle et al. | Jan. 8, 1957 |
| 2,788,839 | Kindle et al. | Apr. 16, 1957 |
| 2,791,258 | Peterson et al. | May 7, 1957 |
| 2,804,448 | Hallenbeck | Aug. 27, 1957 |